July 10, 1928.
G. J. LIPSCOMB
1,676,268
PRESSURE AND VACUUM FILTER
Filed May 23, 1927     2 Sheets-Sheet 1
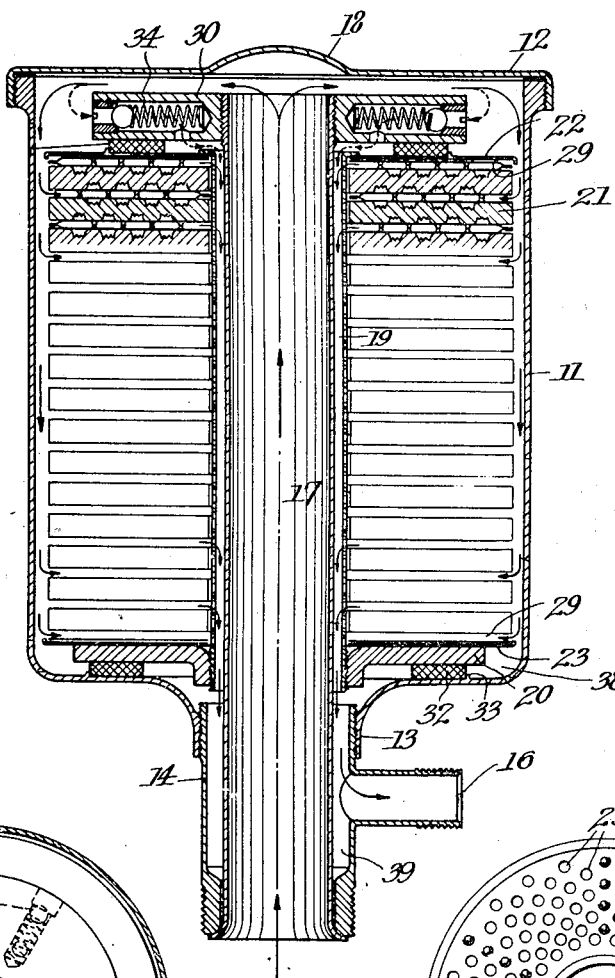
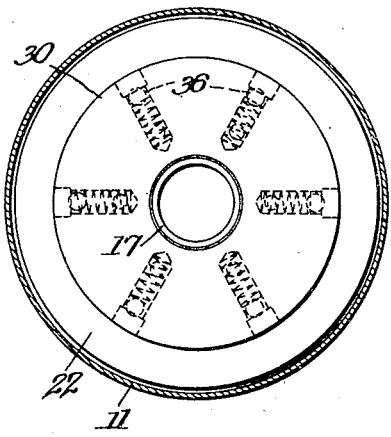
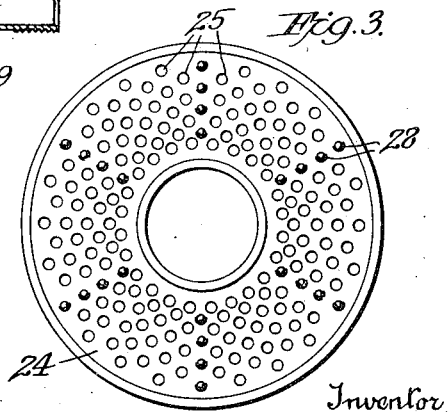
Inventor.
Gaston J. Lipscomb
By Emery, Booth, Janney & Varney
his Attorneys July 10, 1928.
G. J. LIPSCOMB
1,676,268
PRESSURE AND VACUUM FILTER
Filed May 23, 1927    2 Sheets-Sheet 2
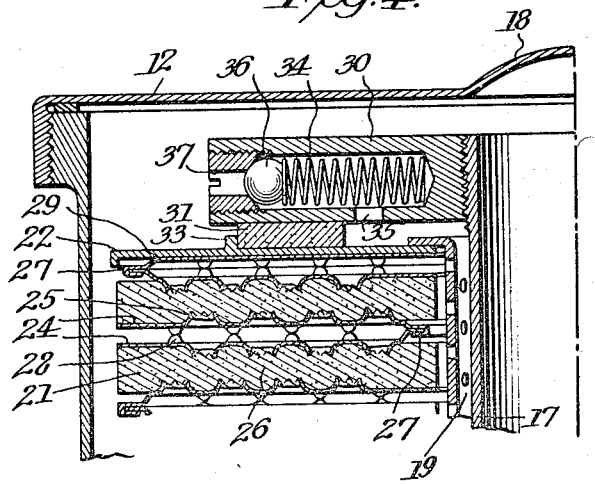
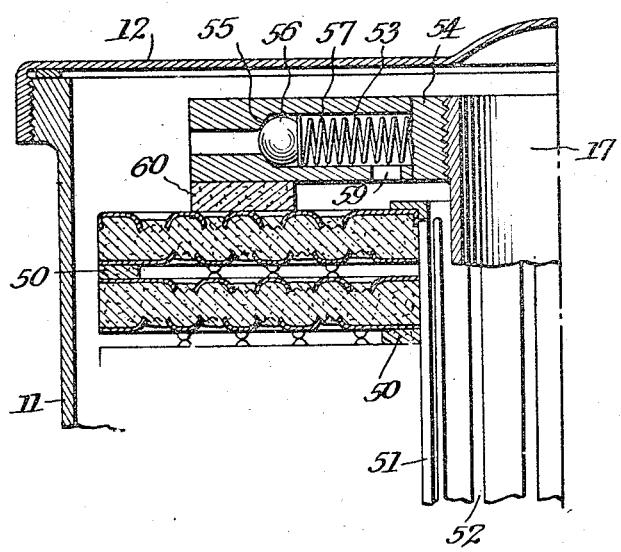
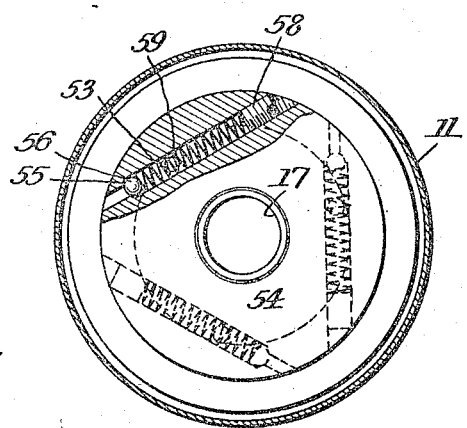
Inventor
Gaston J. Lipscomb Patented July 10, 1928.

1,676,268

UNITED STATES PATENT OFFICE.

GASTON JOEL LIPSCOMB, OF MONTCLAIR, NEW JERSEY.

PRESSURE AND VACUUM FILTER.

Application filed May 23, 1927. Serial No. 193,712.

My invention relates to an improved filter, primarily intended for oil circulatory systems but applicable to filtering the liquids generally, of the type wherein the filtering element consists of a plurality of relatively thin layers of filtering material assembled into a unitary structure, and aims to provide a compact high-capacity filter, having a large effective area relative to its external dimensions, having a unitary filtering assemblage that may be quickly and conveniently changed or replaced with other filtering material and provided with means whereby the flow of liquid will not be diminished in the event that the filtering element becomes clogged Illustrative embodiments of my invention are described in the following specification and shown in the accompanying drawings, wherein Fig. 1 is an elevation in central section, illustrating the pipe connections and the by-pass construction of a preferred form of the invention;

Fig. 2 is a plan view of the same showing the by-pass arrangement;

Fig. 3 is a top view of a filter ring suitable for use with the invention;

Fig. 4 is a partial sectional elevation corresponding to Fig. 1 showing details of the construction of a filter cartridge unit and a by-pass valve and their relation to the various oil passages of the filter;

Fig. 5 is a view similar to Fig. 4 but illustrating a modified construction of the filter cartridge unit and by-pass valves, and Fig. 6 is a plan view of the modified by-pass arrangement shown in Fig. 5.

For convenience I show and describe my improved filter in the axially vertical position of Fig. 1 wherein it operates most advantageously, although it is adaptable for operation in any position.

In the embodiment illustrated in the drawings, the filter consists of a pressed steel cylindrical casing 11 having its upper end formed by an oil-tight screw cap 12, the lower end of the casing preferably being reduced, as at 13 and fitted with a T 14, internally restricted at the lower end of its through passage and threaded on its exterior to receive a suitable coupling for the inlet supply. The stem or side passage is similarly finished and threaded to receive an outlet connection. An imperforate central tube 17, preferably flanged at the bottom to fit the restricted portion of the T 14 and externally threaded at the top, extends from the inlet supply connection through the head of the T 14 and axially through the casing 11, stopping just short of the central dome 18 of the cap 12, where it discharges Surrounding the tube 17 for a part of its upper length, and spaced therefrom, is a perforated tubular filter ring carrier 19, which may be flanged at one end and externally threaded at the other end to take a flanged lock nut 20, providing a conveniently removable unitary means for carrying a plurality of filter rings 21, of suitable material for the desired purpose. These rings 21 are separated by suitable spacing means disposed alternately at outer and inner edges for permitting flow of liquid through them. These filter rings and spacing means are clamped upon the carrier 19, by means of a top collar 22 which bears against the top flange of the carrier tube 19 and a bottom collar 23, and form a compact filter cartridge clamped by the lock-nut 20.

In the form of device illustrated in Figs. 1 and 4 each filter ring comprises a pair of annular thin metal perforated face sheets 24 with central openings slightly larger than the diameter of tube 19, and each having a plurality of oil passages 25 formed by rough-edged perforations all in the same direction, a layer of a suitable filtering medium 26 being held between each pair of sheets 24 by these rough edges. The opposing face sheets of adjacent rings are assembled in the order shown in Figs. 1 and 4, alternate pairs of sheets being crimped together by flanges 27, the first pair at the outer end the second at the inner edge of the ring, and so on. Bosses 28 project in the direction opposite to the perforations 25 to support and space the face sheets at intermediate points. The top and bottom face-sheets 29 are imperforate and bear upon the top collar 22 and the bottom collar 23, respectively, to permit passage of oil through the end filter rings.

A wide flat holding-down nut 30 on the top of the inlet tube 17 bears against a fiber gasket 31 on the collar 22, forcing the cartridge down against another fiber gasket 32 between the lock-nut 20 and the bottom of the casing 11. The gaskets 31 and 32 also fit against beads 33 on the collar 22 and the bottom of the casing, respectively, preventing short-circuiting of the incoming and outgoing streams of oil above and below the filter cartridge.

A plurality of by-pass valves 34 are incorporated in the nut 30 for passage of oil in case clogging of the filter rings builds up more than a predetermined degree of back pressure. These by-pass valves 34 are of the spring-pressed ball type, each contained in a radial chamber having an outlet opening 35 perpendicular thereto near the bottom. The ball 36 is seated against a short hollow screw 37 in the mouth of the chamber, which is made tubular to form an oil inlet, and removable to permit disassembly of the valve.

The space between the bottom gasket 32, lock-nut 20 and the bottom corner of the casing 11 forms a pocket 38 to catch grit and other heavy impurities from the oil. A lower grit pocket 39 is formed between the T 14 and the inlet tube 17, below the outlet stem particularly to collect grit which may be freed from the upper pocket when the filter cartridge is changed.

A modified filter construction is illustrated in Figs. 5 and 6. In this construction gaskets 50 of fiber or other suitable material replace the crimps 27 at the inner and outer edges of alternate pairs of face sheets. The inner edges of the filter rings fit snugly against the outlet tube 51, which tube is accordingly longitudinally slotted as at 52, instead of perforated, for outlet of the filtered oil. In this modification the by-pass valves 53 in the holding-down nut 54 are tangentially arranged in holes passing entirely through the nut, reduced near the inlet end to provide a ball seat 55. A ball 56 and spring 57 are inserted from the rear end of the hole, which is closed by a solid screw 58, backing the spring. Adjustment of the valve to desired working pressures is obtained by setting the screw 58, the bottom of the hole being internally threaded a sufficient distance for this purpose. Relief ports 59 are suitably placed to discharge within the gasket 60.

In operation my filter will be connected into an oil circulatory system by the usual type of compression couplings. The oil enters at the bottom of the tube 17, flows upward and spreads out radially beneath the cap 12, this spread being eased by the dome 18. In normal operation the oil then flows downward between the outer edges of the filter rings 21 and the casing 11, and into the spaces between those pairs of face sheets 24 which are crimped on their inner edges. From these spaces the oil flows through the adjacent perforations 25 into the mass of filtering material 26 above and below, and escapes through the opposite perforations 25 after filtering, into the spaces between such face sheets 24 as are crimped on their outer edges. A certain amount of oil may also travel through the edges of each ring, these being uncovered. Oil in the spaces between outwardly crimped face sheets escapes through holes in the outer tube 19 and flows downwardly between this tube and the inlet tube 17 into the space between the tube 17 and the T 14, whence it escapes by the outlet pipe 16. Solid arrows in Fig. 1 show the normal course of the oil. It will be evident from Figs. 1 and 4 that the face sheets 24 and the inner and outer crimps 27 effectively constrain all oil flowing from the circumference toward the center of the filter assembly to pass through a layer of filtering medium.

In case the exit of oil is restricted by clogging of the rings, or other causes within the filter, as soon as the back pressure for which the by-pass valves are set is reached these valves open, permitting direct flow from the top of the casing into the space within the gasket 31, above the filter cartridge, as shown by the dotted arrows, Fig. 1, and so down between the tubes 17 and 19 to the outlet 16. By this means an uninterrupted flow of lubricant is assured at all times, and the only harm which can arise from clogging of the filter is the circulation of unfiltered oil.

For replacement of the filter cartridge it is necessary only to shut off the oil stream and remove cap 12 and nut 30, whereupon the tube 19, lock-nut 20 and collars 22 and 23 with all the filtering rings 21, firmly secured thereon, can be lifted out and a new cartridge slipped in. By merely replacing the nut 30 and cap 12 the filter is ready for further running, without any adjustment. If convenient the upper grit pocket 38 may be cleaned at the same time. To clean the lower grit pocket 39 it is only necesary, after disassembling the filter, to disconnect the inlet pipe below the T 14 and remove the inlet tube 17.

Although the above description of the operation, and method of changing the filter cartridge, is directed to the form of filter shown by Figs. 1, 2 and 4, it will be obvious that it also substantially covers the modification disclosed by Figs. 5 and 6.

It will be seen from the foregoing that I have invented an apparatus adapted for filtering liquids under pressure which is characterized by compactness and high efficiency, having a large filtering surface within a relatively small casing, capable of long runs without change of the filtering medium, and so organized as to permit quick and easy change of said medium when necessary and a quick restoration of the filter to working condition without the necessity of adjustment after such change. Further advantages are the absence of all wearing or moving parts in normal operation, the provision of means whereby the flow of liquid is assured even when the filtering elements become clogged, the positioning of such means where they are unlikely to collect sediment, and the provision of a plurality of dirt pockets relatively remote from the working elements of the filter. An additional advantage is the provision of a relief valve organization such that the relief passage capacity may be readily changed by substitution of only one member, as by substitution of a holding-down nut 30 with a changed number of such valves.

It is to be understood that my invention is intended for use in connection with systems wherein the circulation of the liquid is obtained by vacuum as well as systems wherein pressure greater than that of the atmosphere is employed.

Having described and illustrated certain preferred forms of my invention, it is to be understood that I do not limit myself thereto, but what I claim is:

1. In a pressure filter, in combination, a casing, a plurality of layers of filtering material assembled upon a perforated hollow carrier within said casing, a smaller imperforate tube within said carrier, means secured to said smaller tube to secure said carrier and said layers within said casing, said smaller tube being adapted to convey liquid to one side of each of said layers and said hollow carrier being adapted to convey liquid away from the opposite side of each of said layers.

2. In a pressure filter, in combination, a casing, a plurality of layers of filtering material assembled upon a perforated outlet tube within said casing, an inlet tube passing through said outlet tube, means at alternate opposite edges of said layers whereby alternate sides of said layers are cut off from direct communication with said outlet tube and said inlet tube, respectively.

3. In a pressure filter, a casing, a central inlet tube extending axially of said casing to a point near the top thereof, a central outlet tube concentric with said inlet tube and of larger diameter, said outlet tube having side openings and a bottom outlet connection, a unitary filter cartridge comprising a plurality of ring-shaped filter elements assembled along said outlet tube and forming therewith a rigid unitary structure, and a nut threaded upon the top of said inlet tube to secure said cartridge in position.

4. In a pressure filter, a casing, a central inlet tube extending axially of said casing to a point near the top thereof, a central outlet tube concentric with said inlet tube and of larger diameter, said outlet tube having side openings and a bottom outlet connection, a unitary filter cartridge comprising a plurality of ring-shaped filter elements assembled along said outlet tube and forming therewith a rigid unitary structure, and a nut threaded upon the top of said inlet tube to secure said cartridge in position, said nut containing a by-pass relief valve.

5. In a vacuum filter, in combination, a casing, a plurality of layers of filtering material assembled upon a perforated outlet tube within said casing, an inlet tube passing through said outlet tube, means at alternate opposite edges of said layers whereby alternate sides of said layers are cut off from direct communication with said outlet tube and said inlet tube, respectively.

In testimony whereof, I have signed my name to this specification.

GASTON J. LIPSCOMB.